(12) United States Patent
Ayyapureddi et al.

(10) Patent No.: US 12,271,623 B2
(45) Date of Patent: Apr. 8, 2025

(54) METADATA IMPLEMENTATION FOR MEMORY DEVICES

(71) Applicant: Micron Technology, Inc., Boise, ID (US)

(72) Inventors: Sujeet V. Ayyapureddi, Boise, ID (US); Scott E. Smith, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 150 days.

(21) Appl. No.: 17/648,513

(22) Filed: Jan. 20, 2022

(65) Prior Publication Data

US 2023/0229348 A1    Jul. 20, 2023

(51) Int. Cl.
*G06F 3/06* (2006.01)

(52) U.S. Cl.
CPC .......... *G06F 3/0656* (2013.01); *G06F 3/0604* (2013.01); *G06F 3/0659* (2013.01); *G06F 3/0679* (2013.01)

(58) Field of Classification Search
CPC .... G06F 3/0656; G06F 3/0604; G06F 3/0659; G06F 3/0679
USPC ......................................................... 711/154
See application file for complete search history.

(56) References Cited

U.S. PATENT DOCUMENTS

| | | | | |
|---|---|---|---|---|
| 10,552,050 B1* | 2/2020 | Verdan | ................. | G06F 3/0659 |
| 10,552,085 B1* | 2/2020 | Chen | ................... | G06F 3/0616 |
| 2017/0255395 A1* | 9/2017 | Weiner | ............... | G06F 13/1694 |
| 2019/0138245 A1* | 5/2019 | Shin | ....................... | G06F 3/0611 |
| 2019/0179742 A1* | 6/2019 | Jin | ........................ | G11C 16/08 |
| 2020/0026653 A1* | 1/2020 | Shveidel | ............ | G06F 12/0868 |

* cited by examiner

*Primary Examiner* — Gautam Sain
(74) *Attorney, Agent, or Firm* — Holland & Hart LLP (57) ABSTRACT

Methods, systems, and devices for metadata implementation for memory devices are described. A memory device may read metadata, transfer the metadata to a buffer, and read information. For example, the memory device may receive a read command from a host device to read information. The memory device may execute a first internal read command to read the metadata associated with the information. Upon reading the metadata, the memory device may store the metadata in the buffer (e.g., one or more latches). Upon determining that a duration has elapsed, the memory device may execute a second internal read command to read the information associated with the metadata. The memory device transmits the information and the metadata to the host device. In some other cases, the memory device may write information, store metadata in a buffer, and write the metadata (e.g., a different order than for read operations).

20 Claims, 5 Drawing Sheets

METADATA IMPLEMENTATION FOR MEMORY DEVICES

FIELD OF TECHNOLOGY

The following relates to one or more systems for memory, including metadata implementation for memory devices.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

In some memory systems, a host device may transmit a read command to read data from a memory device, a write command to write data to the memory device, or both. Memory devices may include portions for storing information and metadata (e.g., information about the host-provided information). A memory device may read or write information, metadata, or both at the memory device.

DETAILED DESCRIPTION

In some systems, a host device may transmit a command to a memory device (e.g., a dynamic random access memory (DRAM) device) to read information (e.g., host data) from the memory device or write information to the memory device. In some cases, the command may include an indication for the memory device to additionally read or write metadata associated with the information. The memory device may read or write information, and may wait for a duration before reading or writing metadata if both the information and associated metadata are stored in a same bank of the memory device using different access operations. Some access operations (e.g., read operations and write operations) may include metadata, while other access operations may not include metadata. If a memory device allocates space for information and metadata for every write operation, it may result in wasted space for the write operations where metadata is not included. The advantage of such an arrangement may be that the memory device may perform a single access operation (e.g., write operation or read operation) to access both the information and the metadata. To preserve the ability to store information with metadata and to store information without metadata, the metadata may be stored in a different location than the information. When accessing metadata, the memory device may issue two separate internal commands to the bank of memory cells: one internal command to access the information and another internal command to access the metadata. It may be desirable to improve efficiency and storage capacity by transferring or storing the metadata to an intermediate location (e.g., a buffer) after reading the metadata or after writing the information to the memory device (e.g., while waiting for the memory device to be ready to write the second chunk of information to the same bank).

To efficiently transfer data to an intermediate location, the memory device may read and write information and metadata in different orders for read operations and write operations and thus transfer a decreased amount of data for intermediate storage (e.g., transfer metadata to the intermediate location). For example, the memory device may receive a first read command from a host device to read information. The memory device may issue a first internal read command to read the metadata associated with the information. Upon reading the metadata, the memory device may transfer the metadata to an intermediate location (e.g., a buffer). If the information and the metadata are stored in the same bank of the memory device, it may take a duration of time for the memory device to be ready to perform another internal access command of the same bank. Upon determining that the duration has elapsed, the memory device may issue a second internal read command to read the information associated with the metadata. The memory device may retrieve the metadata from the buffer and transmit the information and the metadata to the host device. By reading the metadata before reading the associated information, the memory device may transfer the metadata to be temporarily stored in the buffer. Storing metadata in a buffer may take up relatively less storage space than storing the information in the buffer. That is, the metadata may include less data than the information and thus the buffer may be smaller than if the information were stored in the buffer.

In some examples, for write commands, the memory device may receive a first write command from a host device to write information (e.g., and metadata). The memory device may issue a first internal write read command to write the information included in the write command. The memory device may store the metadata associated with the information to an intermediate location (e.g., a buffer). The memory device may wait for a duration until the memory device is ready to perform another write operation on the same bank. Upon determining that the duration has elapsed, the memory device may issue a second internal write command to write the metadata associated with the information to the memory array. That is, the memory device may retrieve the metadata from the buffer and write the metadata to the memory device. By writing the information before writing the associated metadata, the memory device may store the metadata to the buffer which may take up relatively less storage space than storing the information to the buffer.

Features of the disclosure are initially described in the context of a system as described with reference to FIG. 1. Features of the disclosure are described in the context of flowcharts as described with reference to FIGS. 2 and 3. These and other features of the disclosure are further illustrated by and described with reference to an apparatus diagram and flowcharts that relate to metadata implementation for memory devices as described with reference to FIGS. 4 and 5.

Figure 1:
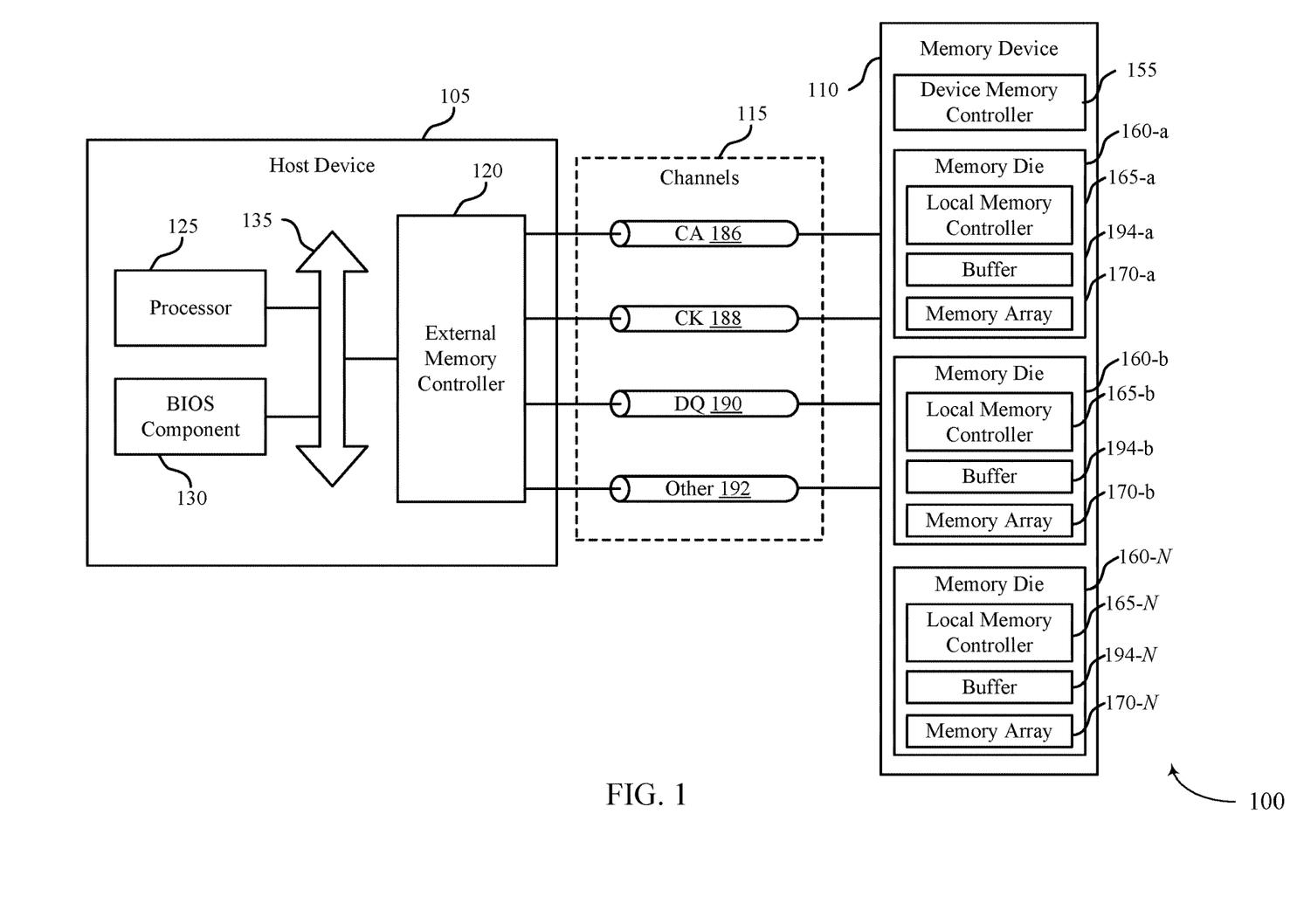
FIG. 1 illustrates an example of a system that supports metadata implementation for memory devices in accordance with examples as disclosed herein.

FIG. 1 illustrates an example of a system 100 that supports metadata implementation for memory devices in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

In some examples, the system 100 or the host device 105 may include an I/O controller. An I/O controller may manage data communication between the processor 125 and the peripheral component(s) (e.g., input devices, output devices). The I/O controller may manage peripherals that are not integrated into or with the system 100 or the host device 105. In some examples, the I/O controller may represent a physical connection (e.g., one or more ports) with external peripheral components.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-$a$, memory die 160-$b$, memory die 160-N) may include a local memory controller 165 (e.g., local memory controller 165-$a$, local memory controller 165-$b$, local memory controller 165-N), a buffer 194 configured to store metadata (e.g., buffer 194-$a$, buffer 194-$b$, buffer 194-N), and a memory array 170 (e.g., memory array 170-$a$, memory array 170-$b$, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package. A buffer 194 may include one or more latches configured to store information. In some cases, the buffer 194 may be configured to store data for a specified duration. In some cases, the buffer 194 may be configured to store data until the data is overwritten or otherwise erased. The buffer 194 may be an example of volatile memory.

The device memory controller 155 may include components (e.g., circuitry, logic) operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive information (e.g., data, commands, or both) from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, data channels 190 may be operable to communicate information (e.g., data, control information) between the host device 105 and the memory device 110. For example, the data channels 190 may communicate information (e.g., bi-directional) to be written to the memory device 110 or information read from the memory device 110.

In some memory systems, a memory device 110 may read and write information and metadata in one or more orders and thus transfer or store a decreased amount of data for intermediate storage (e.g., transfer metadata to an intermediate location). The memory device 110 may be configured to receive access commands (e.g., read commands and write commands) for information and other access commands (e.g., read commands and write commands) for information and metadata about the information. The read commands or write commands may be received from the host device 105 over the CA channel 186 or some other channel. The memory device 110 could be configured to allocate space for both information and metadata for every write operation. However, if a write operation does not include metadata, that may result in the space allocated for the metadata being unused. Such a situation may reduce the performance of the memory device 110. In some examples, the memory device 110 may be configured to store information and metadata in different locations. Such a configuration may allow the memory device 110 to receive some access commands that are associated with metadata and other access commands that are not associated with metadata and allocate space efficiently. To store the metadata in a different location than the information, the memory device 110 may perform multiple internal accesses (e.g., internal read command or internal write command) of a single bank (or other subset) of memory cells. For example, the memory device 110 may receive a first read command from a host device 105 to read information. The memory device 110 may issue a a first internal read command to read the metadata associated with the information. Upon reading the metadata, the memory device 110 may transfer the metadata to an intermediate location (e.g., buffer 194). Upon determining that a duration has elapsed, the memory device 110 may issue a second internal read command to read the information associated with the metadata. The memory device 110 may transmit the information and the metadata to the host device 105. An internal access command (e.g., internal read command or internal write command) may refer to an command issued by a controller or logic at the memory device 110 (e.g., device memory controller 155 or local memory control 165). In some cases, internal commands executed by the memory device 110 may be in response to receiving commands from the host device 105. In some examples, internal commands executed by the memory device 110 may be issued by the memory device 110 as background operations.

In some examples, for write commands, the memory device 110 may receive a write command from a host device 105 to write information. The memory device 110 may execute a first internal write read command to write the information associated with the metadata. The memory device 110 may store the metadata to an intermediate location (e.g., buffer 194). Upon determining that a duration has elapsed, the memory device 110 may execute a second internal write command to write the metadata associated with the information. The memory device 110 may retrieve the metadata from the buffer 194 and write the metadata to the memory device 110. By reading and writing the information and metadata in such orders, the memory device 110 may transfer the metadata to the buffer 194 which may take up relatively less storage space than transferring the information to the buffer 194.

Figure 2:
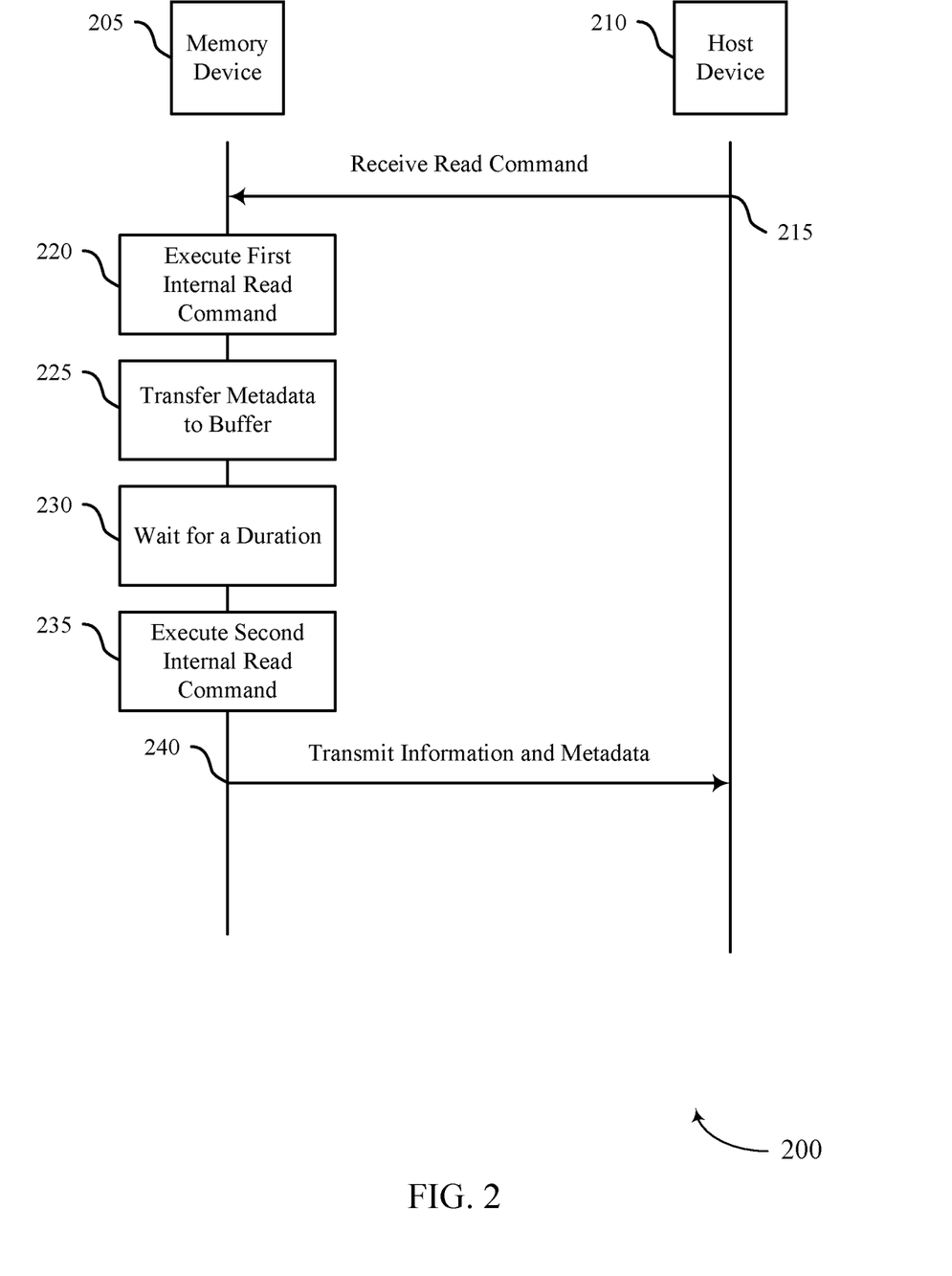
FIG. 2 illustrates an example of a flowchart that supports metadata implementation for memory devices in accordance with examples as disclosed herein.

FIG. 2 illustrates an example of a flowchart 200 that supports metadata implementation for memory devices in accordance with examples as disclosed herein. The flowchart 200 may implement or be implemented by aspects of the system 100 as described with reference to FIG. 1. In some examples, the flowchart 200 may include example operations associated with corresponding devices described with reference to FIG. 1 (e.g., memory device 110, host device 105). In the following description of the flowchart 200, the operations may be performed in a different order than the example order shown, or at different times. Some operations may also be omitted from the flowchart 200, and other operations may be added to the flowchart 200. A location as described herein may refer to a logical address maintained by a host device, or a physical address maintained by one or more memory devices, or both. Accessing as described herein may refer to reading, writing, or both, by a memory device. In some cases, information transmitted by the host device, received by a memory device, or both, may be referred to as host data.

A memory device 205 may be configured to receive access commands (e.g., read commands or write commands) from a host device 210. Additionally or alternatively, the memory device 205 may be configured to execute or issue internal access commands (e.g., internal read commands or internal write commands). In some examples, the memory device 205 may issue internal access commands in response to receiving one or more access commands from the host device 210. In some examples, the memory device 205 may issue internal access commands in response to determinations made by the memory device 205 (e.g., as part of background operations). Commands issued by a host device may be referred to as external commands or host commands, in some cases. Commands issued by a memory device may be referred to as internal commands, in some cases.

At 215, memory device 205 (e.g., a DRAM device) may receive, from host device 210, a read command to retrieve first information from a first location of memory device 205. The read command may be an example of an external read command or a host read command issued by the host device 210 and received by the memory device 205. The read command may be received over a CA channel.

In some examples, memory device 205 may receive, as part of the first command, a first indication that the first information is associated with the first metadata. The first information and the first metadata may be received over a data channel and/or other channels. In some examples, memory device 205 may receive the first indication from host device 210 as a part of the read command, or as a separate message after receiving the read command. The first indication may indicate that there exists some metadata associated with the first information, may indicate a location of the metadata, or may be the metadata itself.

Metadata may refer to data that describes or gives information about other data. In some examples, the metadata may be parity bits or information used for error detection or error correction. In some examples, metadata may include pointers or other indicators used to indicate other data about the associated information. In some examples, metadata for file data may include a date or time when the file data was created. Metadata is not limited to dates or times, however, and may refer to any data that describes or gives information about other data, such as the information provided by the host device 210 for storage in the memory device 205.

At 220, memory device 205 may execute a first internal read command to retrieve first metadata associated with the first information in the first command from a second location of memory device 205 based on receiving the read command. Issuing the first internal read command to retrieve the first metadata may be based on receiving the first indication in the read command. The first internal read command may be an example of an internal read command issued by the memory device 205.

Executing or Issuing a command (e.g., issuing a read command, issuing a write command) and receiving a command from host device 210 (e.g., receiving a read command, receiving a write command) may be associated with one or more differences. For example, issued commands by memory device 205 may be generated by memory device 205, while received commands from host device 210 may be generated by host device 210. In some other examples, memory device 205 may execute or issue one or more commands in response to receiving a command from host device 210. That is, memory device 205 may receive a command from host device 210, perform one or more internal processes, and determine to issue a read command for metadata or issue a read command for information. For example, to transfer less data to a buffer, memory device 205 may first issue a read command for metadata even though memory device 205 received a command to read information.

In some examples, the first location may be part of a first portion of memory device 205 reserved for storing information, and the second location may be part of a second portion of memory device 205 reserved for storing metadata. That is, metadata may be carved out of an existing array space in memory device 205 (e.g., without increasing a die size at memory device 205). For example, a portion of memory device 205 may be carved out or dedicated for metadata, and another portion of memory device 205 may be carved out or dedicated for information. As space for storing metadata may be carved out of the existing array space, memory device 205 may perform a two column access procedure (e.g., from a same bank or a same open page of memory device 205) to read or write data at memory device 205. By allocating space in the memory array for information and space for metadata, the memory device 205 may be configured to receive commands associated with metadata and not associated with metadata.

In some examples, the first location and the second location may be located within a same bank of memory device 205. As some accesses (e.g., reads, writes) may or may not be associated with metadata, metadata may be associated with a different column than the information associated with the metadata.

At 225, memory device 205 may transfer the first metadata from the second location of memory device 205 to a buffer based on issuing the second command. The buffer may be an example of storage (such as one or more latches) to temporarily store the first metadata with the information associated with the first metadata is retrieved from the memory device 205.

In some examples, transferring the first metadata to the buffer may be associated with a smaller quantity of latches for storage than a quantity of latches for storage associated with transferring the first information to the buffer. Metadata associated with information may include fewer bits than the information itself. Thus, configuring access operations (e.g., read operations and write operations) to store metadata in a buffer (rather than the information itself) may enable the buffer to be smaller than if the information were stored. Transferring metadata to the buffer may result in fewer latches allocated for storage of data. Such an approach of transferring metadata to the buffer may result in improved storage capacity at the buffer and the memory device 205, as less data may be stored (e.g., metadata may include 8 bits, 16 bits, or the like, and associated information may include 128 bits, or any other value that may be much larger than bits for metadata) while (e.g., before, during, or after) memory device 205 reads the information after the metadata, or while the memory device 205 waits for a duration in between issued access operations for a same bank.

A buffer may refer to any local location, intermediate location, or both, located within, on, adjacent to, or separate from memory device 205 for storing data (e.g., temporarily). Memory device 205 may store metadata in a buffer for a duration between issued internal read commands (e.g., a duration tCCD_L, which may be a column-to-column delay or a command-to-command delay). Additionally or alternatively, memory device 205 may store metadata in a buffer after the duration between the issued internal read commands has elapsed. Memory device 205 may include one or more buffers, and the examples described herein may not be limited to the use of only one buffer, but may use one or more buffers. For example, memory device 205 may transfer the first metadata to one or more buffers.

At 230, memory device 205 may determine that a first duration has elapsed since issuing the second command. The first duration may be referred to as tCCD_L (e.g., for accessing a same bank or group of banks for multiple access operations), which may refer to a longer duration (e.g., corresponding to "L") than that of tCCD_S (e.g., for accessing different banks or different bank groups). That is, memory device 205 may wait for tCCD_L before issuing another access (e.g., read) command (e.g., an issued third command) for the same bank as for an initial access command (e.g., the issued second command). The memory device 205 may wait for tCCD_S before issuing another access (e.g., read) command (e.g., an issued third command) for the different bank as for an initial access command (e.g., the issued second command). Memory device 205 may latch metadata upon determining that the first duration has elapsed, or may latch metadata during the first duration.

At 235, memory device 205 may execute a second internal read command to retrieve the first information from the first location based on receiving the read command and transferring the first metadata to the buffer, where issuing the second internal read command after issuing the first internal read command may be based on determining that the first duration has elapsed. Due to issuing two read internal commands for a same bank, memory device 205 may wait for the first duration to elapse before issuing the next internal read command for reading the first information. Such a two column access (e.g., issuing both internal read commands) may be associated with memory device 205 transferring (e.g., store) the first metadata locally (e.g., to the buffer) while (e.g., before, during, or after) memory device 205 retrieves the first information (e.g., the second access) from the first location (e.g., from a memory array). The second internal read command may be an example of an internal read command issued by the memory device 205.

At 240, memory device 205 may transmit, to the host device 210, the first information and the first metadata based at least in part on issuing the second internal read command. That is, the two accesses (e.g., both issued internal read commands for the metadata and information) may be concatenated and transmitted to the host device 210. Memory device 205 may concatenate the metadata from the buffer with the information from the issued second internal read command and may transmit the concatenated information and metadata to the host device 210. In some examples, the transmission may include the first information and the first metadata and may thus extend the transmission burst by a quantity of beats, or quantity of unit intervals (UIs), or a corresponding quantity of clock cycles (e.g., 2 beats, 2 UIs, 1 clock cycle, or 4 beats, 4 UIs, 2 clock cycles, or the any other values) compared to a transmission that includes the first information. A controller may expect information followed by associated metadata on tail burst bits for the transmission to the host device 210. Alternatively, the controller may expect the associated metadata followed by the information for the transmission to the host device 210.

Figure 3:
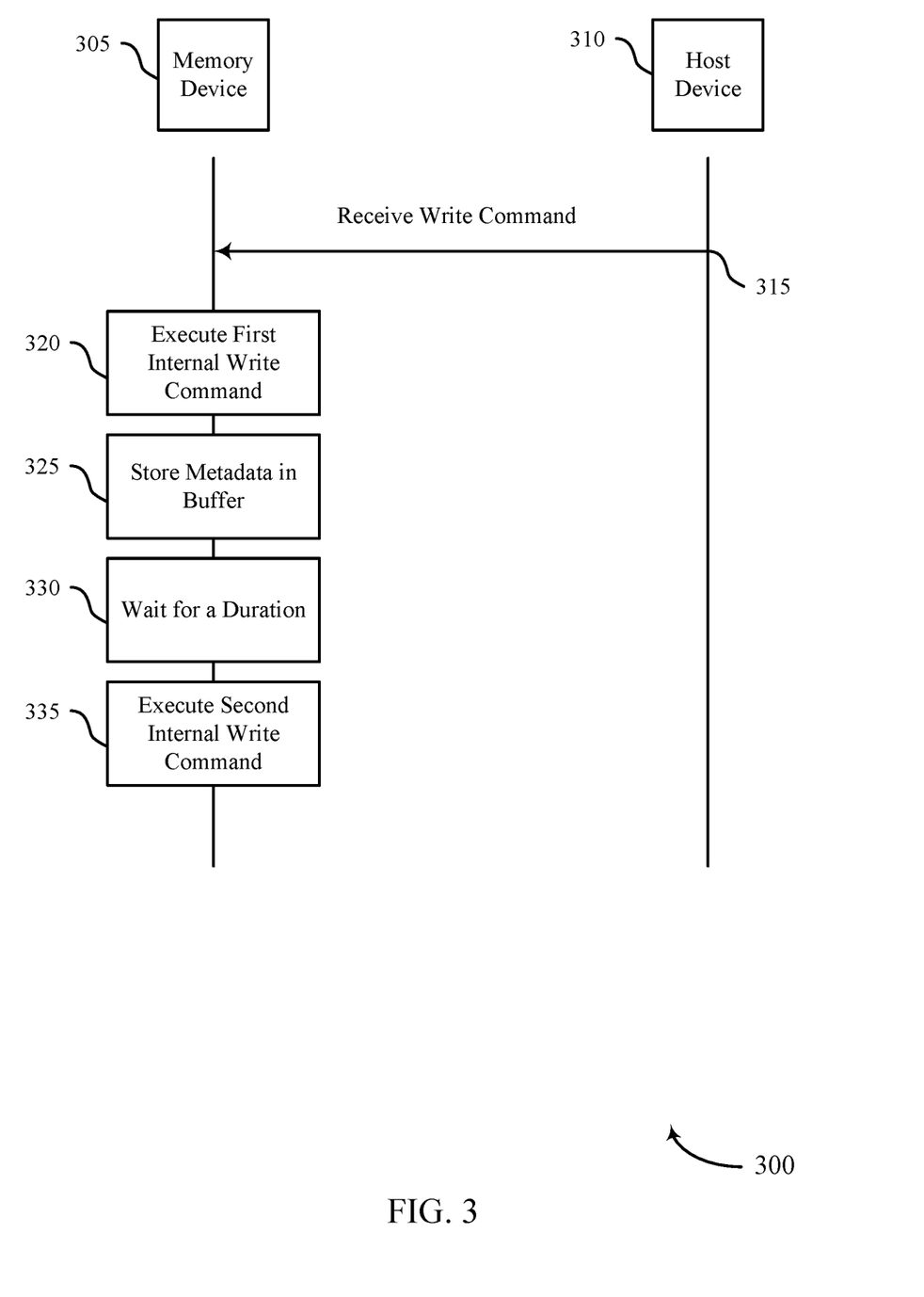
FIG. 3 illustrates an example of a flowchart that supports metadata implementation for memory devices in accordance with examples as disclosed herein.

FIG. 3 illustrates an example of a flowchart 300 that supports metadata implementation for memory devices in accordance with examples as disclosed herein. The flowchart 300 may implement or be implemented by aspects of the system 100, flowchart 200, or a combination of these, as described with reference to FIGS. 1 and 2. In some examples, the flowchart 300 may include example operations associated with corresponding devices described with reference to FIGS. 1 and 2 (e.g., memory device 110, memory device 205, host device 105, host device 210). In the following description of the flowchart 300, the operations may be performed in a different order than the example order shown, or at different times. Some operations may also be omitted from the flowchart 300, and other operations may be added to the flowchart 300. A location as described herein may refer to a logical address maintained by a host device, or a physical address maintained by one or more memory devices, or both. In some cases, information transmitted by the host device, received by a memory device, or both, may be referred to as host data.

A memory device 305 may be configured to receive access commands (e.g., read commands or write commands) from a host device 310. Additionally or alternatively, the memory device 305 may be configured to issue internal access commands (e.g., internal read commands or internal write commands). In some examples, the memory device 305 may execute internal access commands in response to receiving one or more access commands from the host device 310. In some examples, the memory device 305 may issue internal access commands in response to determinations made by the memory device 305 (e.g., as part of background operations). Commands issued by a host device may be referred to as external commands or host commands, in some cases. Commands issued by a memory device may be referred to as internal commands, in some cases.

At 315, memory device 305 (e.g., a DRAM device) may receive, from host device 320, a write command to write second information to a third location of the memory device and to write second metadata associated with the second information to memory device 305, where writing the second information occurs before writing the second metadata. The write command may be an example of an external write command or a host write command issued by the host device 310 and received by the memory device 305.

In some examples, memory device 305 may receive, as part of the write command, a second indication that the second information is associated with the second metadata. In some examples, memory device 305 may receive the second indication from host device 310 as a part of the write command, or as a separate message after receiving the write command. The second indication may indicate that there exists some metadata associated with the second information, may indicate the second metadata itself associated with the second information (e.g., the second metadata itself, or the like), or both. That is, a controller at host device 310 may transmit the second information followed by the second metadata (e.g., if any) to memory device 305.

At 320, memory device 305 may execute a first internal write command to write the second information to the third location of memory device 305 based on receiving the write command. In this case, the column access order is different from that of read operations as described in FIG. 2. That is, memory device 305 may first write the second information, whereas memory device 205 may first read the first metadata. The first internal command may be an example of an internal write command issued by the memory device 305.

At 325, memory device 305 may store the second metadata in a buffer based on executing the first internal write command. By writing the information to memory device 305, memory device 305 may be able to store metadata in the buffer, which may be associated with a smaller quantity of latches than that associated with storing the information in the buffer.

At 330, memory device 305 may determine that a second duration has elapsed since executing the first internal write command. The second duration may be tCCD_L as described similarly in FIG. 2. Alternatively, the second duration may be a different duration than tCCD_L, such as TCCD_S.

At 335, memory device 305 may execute a second internal write command to write the second metadata to a fourth location of memory device 305 based on receiving the write command and transferring the second metadata to the buffer, where executing the second internal write command after executing the first internal write command may be based on determining that the second duration has elapsed, and where executing the second internal write command to write the second metadata may be based on receiving the second indication. Due to issuing two write commands for a same bank, memory device 305 may wait for the second duration to elapse before issuing the next internal write command for writing the second metadata (e.g., the third location and the fourth location may be located within a same bank). In some cases, the command to write metadata may be a read-modify-write (RMW) command as incoming data may be less than a native prefetch associated with memory device 305. The second internal write command may be an example of an internal write command issued by the memory device 305.

In some examples, the third location may be part of a first portion of memory device 305 reserved for storing information, and the fourth location may be part of a second portion of memory device 305 reserved for storing metadata. That is, metadata may be carved out of an existing array space in memory device 305 (e.g., without increasing a die size at memory device 305). For example, a portion of memory device 305 may be carved out or dedicated for metadata, and another portion of memory device 305 may be carved out or dedicated for information.

Figure 4:
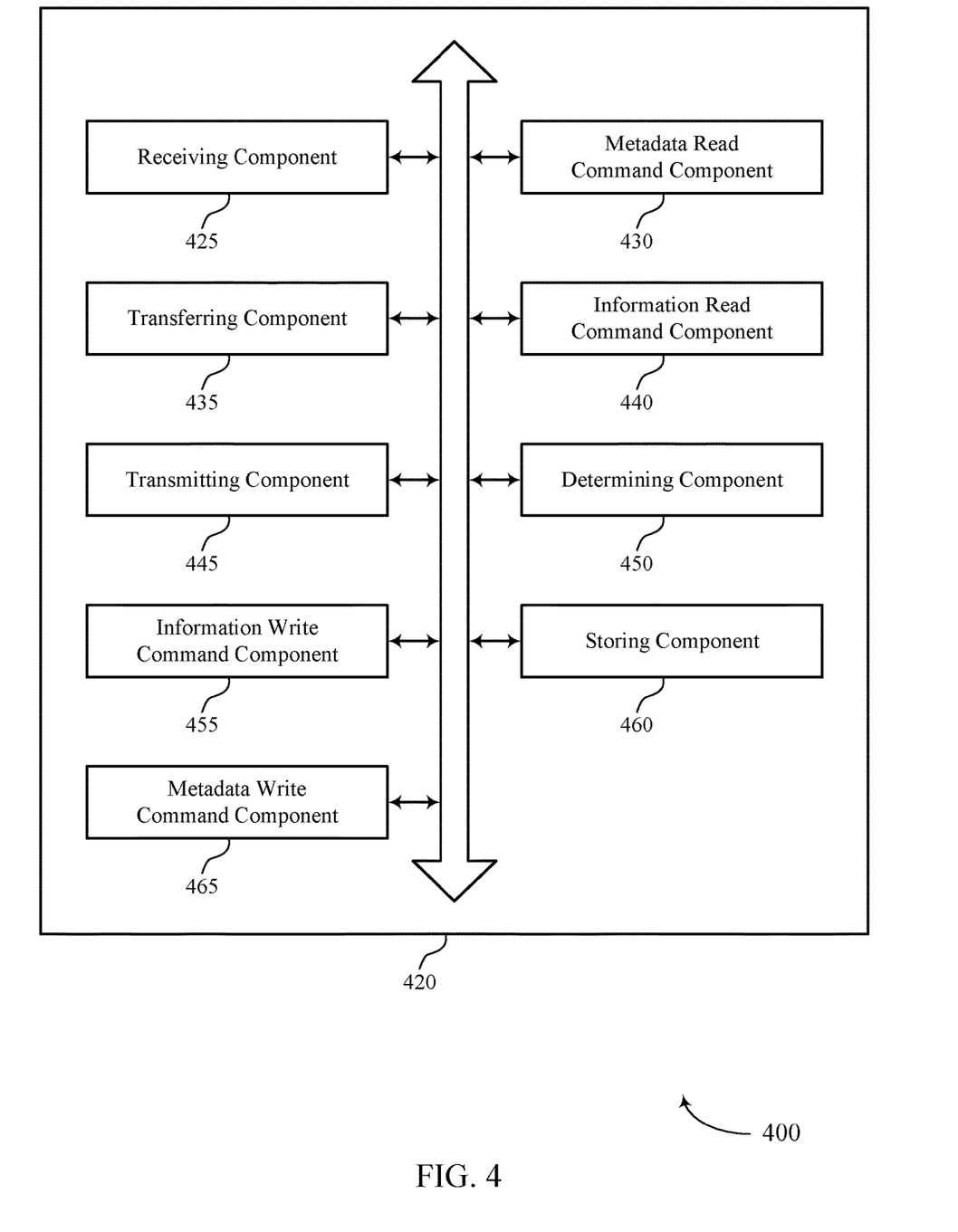
FIG. 4 shows a block diagram of a memory device that supports metadata implementation for memory devices in accordance with examples as disclosed herein.

FIG. 4 shows a block diagram 400 of a memory device 420 that supports metadata implementation for memory devices in accordance with examples as disclosed herein. The memory device 420 may be an example of aspects of a memory device as described with reference to FIGS. 1 through 3. The memory device 420, or various components thereof, may be an example of means for performing various aspects of metadata implementation for memory devices as described herein. For example, the memory device 420 may include a receiving component 425, a metadata read command component 430, a transferring component 435, an information read command component 440, a transmitting component 445, a determining component 450, an information write command component 455, a storing component 460, a metadata write command component 465, or any combination thereof. Each of these components may communicate, directly or indirectly, with one another (e.g., via one or more buses).

The receiving component 425 may be configured as or otherwise support a means for receiving, from a host device, a read command to retrieve first information from a first location of a memory device. The metadata read command component 430 may be configured as or otherwise support a means for executing a first internal read command to retrieve first metadata associated with the first information in the read command from a second location of the memory device based at least in part on receiving the read command. The transferring component 435 may be configured as or otherwise support a means for transferring the first metadata from the second location of the memory device to a buffer based at least in part on executing the first internal read command. The information read command component 440 may be configured as or otherwise support a means for executing a second internal read command to retrieve the first information from the first location based at least in part on receiving the read command and transferring the first metadata to the buffer. The transmitting component 445 may be configured as or otherwise support a means for transmitting, to the host device, the first information and the first metadata based at least in part on executing the second internal read command.

In some examples, to support receiving the read command, the receiving component 425 may be configured as or otherwise support a means for receiving, as part of the read command, a first indication that the first information is associated with the first metadata, where executing the first internal read command to retrieve the first metadata is based at least in part on receiving the first indication.

In some examples, the determining component 450 may be configured as or otherwise support a means for determining that a first duration has elapsed since executing the first internal read command, where executing the second internal read command after executing the first internal read command is based at least in part on determining that the first duration has elapsed.

In some examples, the first location is part of a first portion of the memory device reserved for storing information, and the second location is part of a second portion of the memory device reserved for storing metadata. In some examples, the first location and the second location are located within a same bank of the memory device.

In some examples, the receiving component 425 may be configured as or otherwise support a means for receiving, from the host device, a write command to write second information to a third location of the memory device and to write second metadata associated with the second information to the memory device, where writing the second information occurs before writing the second metadata.

In some examples, the information write command component 455 may be configured as or otherwise support a means for executing a first internal write command to write the second information to the third location of the memory device based at least in part on receiving the write command. In some examples, the storing component 460 may be configured as or otherwise support a means for storing the second metadata in the buffer based at least in part on executing the first internal write command. In some examples, the metadata write command component 465 may be configured as or otherwise support a means for executing a second internal write command to write the second metadata to a fourth location of the memory device based at least in part on receiving the write command and transferring the second metadata to the buffer.

In some examples, to support receiving the write command, the receiving component 425 may be configured as or otherwise support a means for receiving, as part of the write command, a second indication that the second information is associated with the second metadata, where executing the second internal write command to write the second metadata is based at least in part on receiving the second indication.

In some examples, the determining component 450 may be configured as or otherwise support a means for determining that a second duration has elapsed since executing the first internal write command, where executing the second internal write command after executing the first internal write command is based at least in part on determining that the second duration has elapsed.

In some examples, the third location is part of a first portion of the memory device reserved for storing information, and the fourth location is part of a second portion of the memory device reserved for storing metadata. In some examples, the third location and the fourth location are located within a same bank.

In some examples, transferring the first metadata to the buffer is associated with a smaller quantity of latches for storage than a quantity of latches for storage associated with transferring the first information to the buffer.

Figure 5:
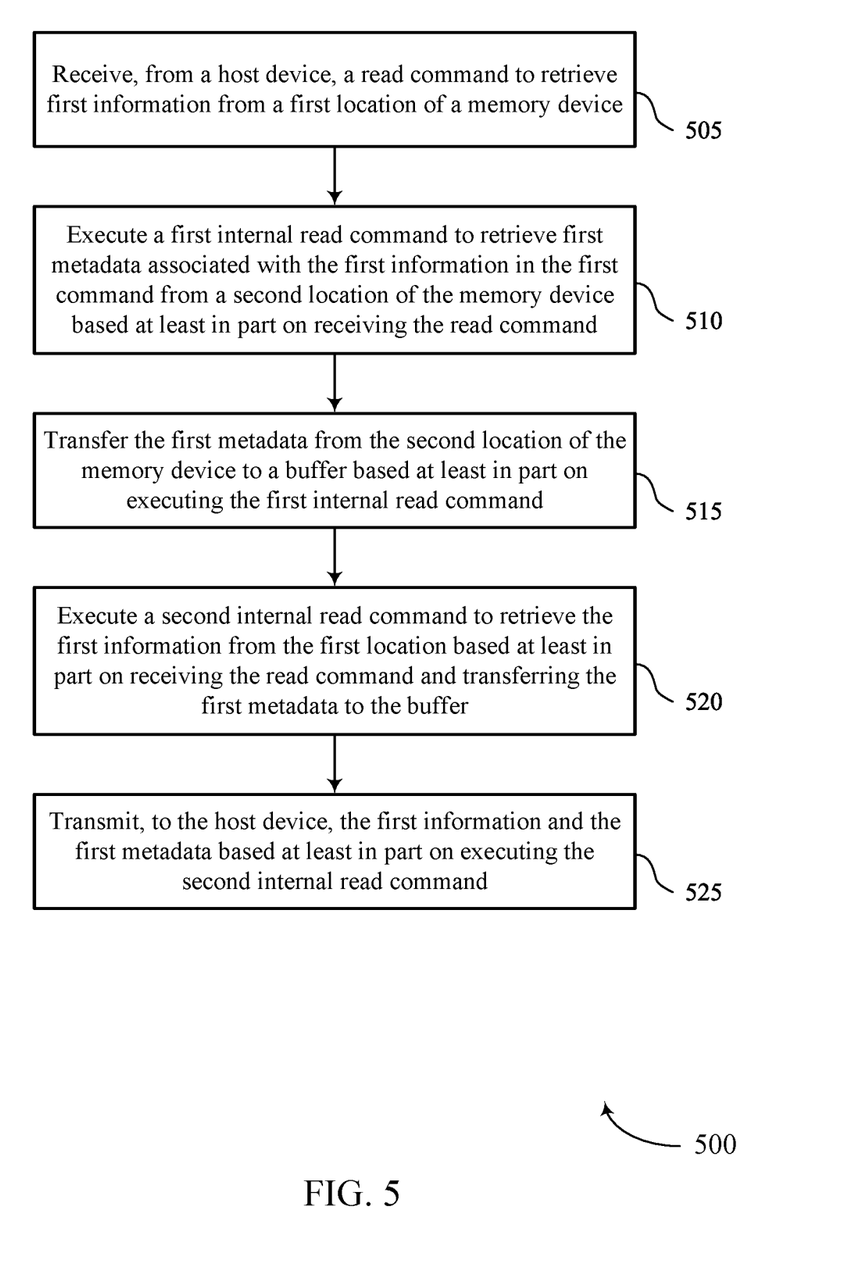
FIG. 5 shows a flowchart illustrating a method or methods that support metadata implementation for memory devices in accordance with examples as disclosed herein.

FIG. 5 shows a flowchart illustrating a method 500 that supports metadata implementation for memory devices in accordance with examples as disclosed herein. The operations of method 500 may be implemented by a memory device or its components as described herein. For example, the operations of method 500 may be performed by a memory device as described with reference to FIGS. 1 through 4. In some examples, a memory device may execute a set of instructions to control the functional elements of the device to perform the described functions. Additionally or alternatively, the memory device may perform aspects of the described functions using special-purpose hardware.

At 505, the method may include receiving, from a host device, a read command to retrieve first information from a first location of a memory device. The operations of 505 may be performed in accordance with examples as disclosed herein. In some examples, aspects of the operations of 505 may be performed by a receiving component 425 as described with reference to FIG. 4.

At 510, the method may include executing a first internal read command to retrieve first metadata associated with the first information in the read command from a second location of the memory device based at least in part on receiving the read command. The operations of 510 may be performed in accordance with examples as disclosed herein. In some examples, aspects of the operations of 510 may be performed by a metadata read command component 430 as described with reference to FIG. 4.

At 515, the method may include transferring the first metadata from the second location of the memory device to a buffer based at least in part on executing the first internal read command. The operations of 515 may be performed in accordance with examples as disclosed herein. In some examples, aspects of the operations of 515 may be performed by a transferring component 435 as described with reference to FIG. 4.

At 520, the method may include executing a second internal read command to retrieve the first information from the first location based at least in part on receiving the read command and transferring the first metadata to the buffer. The operations of 520 may be performed in accordance with examples as disclosed herein. In some examples, aspects of the operations of 520 may be performed by an information read command component 440 as described with reference to FIG. 4.

At 525, the method may include transmitting, to the host device, the first information and the first metadata based at least in part on executing the second internal read command. The operations of 525 may be performed in accordance with examples as disclosed herein. In some examples, aspects of the operations of 525 may be performed by a transmitting component 445 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, from a host device, a read command to retrieve first information from a first location of a memory device; executing a first internal read command to retrieve first metadata associated with the first information in the read command from a second location of the memory device based at least in part on receiving the read command; transferring the first metadata from the second location of the memory device to a buffer based at least in part on executing the first internal read command; executing a second internal read command to retrieve the first information from the first location based at least in part on receiving the read command and transferring the first metadata to the buffer; and transmitting, to the host device, the first information and the first metadata based at least in part on executing the second internal read command.

Aspect 2: The method, apparatus, or non-transitory computer-readable medium of aspect 1 where receiving the read command includes operations, features, circuitry, logic, means, or instructions, or any combination thereof for receiving, as part of the read command, a first indication that the first information is associated with the first metadata, where executing the first internal read command to retrieve the first metadata is based at least in part on receiving the first indication.

Aspect 3: The method, apparatus, or non-transitory computer-readable medium of any of aspects 1 through 2, further including operations, features, circuitry, logic, means, or instructions, or any combination thereof for determining that a first duration has elapsed since executing the first internal read command, where executing the second internal read command after executing the first internal read command is based at least in part on determining that the first duration has elapsed.

Aspect 4: The method, apparatus, or non-transitory computer-readable medium of any of aspects 1 through 3 where the first location is part of a first portion of the memory device reserved for storing information, and the second location is part of a second portion of the memory device reserved for storing metadata.

Aspect 5: The method, apparatus, or non-transitory computer-readable medium of any of aspects 1 through 4 where the first location and the second location are located within a same bank of the memory device.

Aspect 6: The method, apparatus, or non-transitory computer-readable medium of any of aspects 1 through 5, further including operations, features, circuitry, logic, means, or instructions, or any combination thereof for receiving, from the host device, a write command to write second information to a third location of the memory device and to write second metadata associated with the second information to the memory device, where writing the second information occurs before writing the second metadata.

Aspect 7: The method, apparatus, or non-transitory computer-readable medium of aspect 6, further including operations, features, circuitry, logic, means, or instructions, or any combination thereof for executing a first internal write command to write the second information to the third location of the memory device based at least in part on receiving the write command; storing the second metadata in the buffer based at least in part on executing the first internal write command; and executing a second internal write command to write the second metadata to a fourth location of the memory device based at least in part on receiving the write command and transferring the second metadata to the buffer.

Aspect 8: The method, apparatus, or non-transitory computer-readable medium of aspect 7 where receiving the write command includes operations, features, circuitry, logic, means, or instructions, or any combination thereof for receiving, as part of the write command, a second indication that the second information is associated with the second metadata, where executing the second internal write command to write the second metadata is based at least in part on receiving the second indication.

Aspect 9: The method, apparatus, or non-transitory computer-readable medium of any of aspects 7 through 8, further including operations, features, circuitry, logic, means, or instructions, or any combination thereof for determining that a second duration has elapsed since executing the first internal write command, where executing the second internal write command after executing the first internal write command is based at least in part on determining that the second duration has elapsed.

Aspect 10: The method, apparatus, or non-transitory computer-readable medium of any of aspects 7 through 9 where the third location is part of a first portion of the memory device reserved for storing information, and the fourth location is part of a second portion of the memory device reserved for storing metadata.

Aspect 11: The method, apparatus, or non-transitory computer-readable medium of any of aspects 7 through 10 where the third location and the fourth location are located within a same bank.

Aspect 12: The method, apparatus, or non-transitory computer-readable medium of any of aspects 1 through 11 where transferring the first metadata to the buffer is associated with a smaller quantity of latches for storage than a quantity of latches for storage associated with transferring the first information to the buffer.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 13: An apparatus, including: a host device; and a memory device, the memory device including a buffer, where the memory device is configured to: receive, from a host device, a read command to retrieve first information from a first location of a memory device; execute a first internal read command to retrieve first metadata associated with the first information in the read command from a second location of the memory device based at least in part on receiving the read command; transfer the first metadata from the second location of the memory device to a buffer based at least in part on executing the first internal read command; execute a second internal read command to retrieve the first information from the first location based at least in part on receiving the read command and transferring the first metadata to the buffer; and transmit, to the host device, the first information and the first metadata based at least in part on executing the second internal read command.

Aspect 14: The apparatus of aspect 13, where receiving the read command is configured to cause the memory device to: receive, as part of the read command, a first indication that the first information is associated with the first metadata, where executing the first internal read command to retrieve the first metadata is based at least in part on receiving the first indication.

Aspect 15: The apparatus of any of aspects 13 through 14, where the controller is further configured to cause the memory device to: determine that a first duration has elapsed since executing the first internal read command, where executing the second internal read command after executing the first internal read command is based at least in part on determining that the first duration has elapsed.

Aspect 16: The apparatus of any of aspects 13 through 15, where the first location is part of a first portion of the memory device reserved for storing information, and the second location is part of a second portion of the memory device reserved for storing metadata.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
receiving, from a host device, an external read command to retrieve first information from a first location of a memory device;
executing a first internal read command to retrieve first metadata associated with the first information in the external read command from a second location of the memory device based at least in part on receiving the external read command from the host device, wherein the first information and the first metadata were stored in the memory device;
transferring the first metadata from the second location of the memory device to a buffer based at least in part on executing the first internal read command;
executing a second internal read command to retrieve the first information from the first location based at least in part on receiving the external read command and transferring the first metadata to the buffer; and
transmitting, to the host device, the first information and the first metadata based at least in part on executing the second internal read command.

2. The method of claim 1, wherein receiving the external read command comprises:
receiving, as part of the external read command, a first indication that the first information is associated with the first metadata, wherein executing the first internal read command to retrieve the first metadata is based at least in part on receiving the first indication.

3. The method of claim 1, further comprising:
determining that a first duration has elapsed since executing the first internal read command, wherein executing the second internal read command after executing the first internal read command is based at least in part on determining that the first duration has elapsed.

4. The method of claim 1, wherein the first location is part of a first portion of the memory device reserved for storing information, and the second location is part of a second portion of the memory device reserved for storing metadata.

5. The method of claim 1, wherein the first location and the second location are located within a same bank of the memory device.

6. The method of claim 1, further comprising:
receiving, from the host device, a write command to write second information to a third location of the memory device and to write second metadata associated with the second information to the memory device, wherein writing the second information occurs before writing the second metadata.

7. The method of claim 6, further comprising:
executing a first internal write command to write the second information to the third location of the memory device based at least in part on receiving the write command;
storing the second metadata in the buffer based at least in part on executing the first internal write command; and
executing a second internal write command to write the second metadata to a fourth location of the memory device based at least in part on receiving the write command and transferring the second metadata to the buffer.

8. The method of claim 7, wherein receiving the write command comprises:
receiving, as part of the write command, a second indication that the second information is associated with the second metadata, wherein executing the second internal write command to write the second metadata is based at least in part on receiving the second indication.

9. The method of claim 7, further comprising:
determining that a second duration has elapsed since executing the first internal write command, wherein executing the second internal write command after executing the first internal write command is based at least in part on determining that the second duration has elapsed.

10. The method of claim 7, wherein the third location is part of a first portion of the memory device reserved for storing information, and the fourth location is part of a second portion of the memory device reserved for storing metadata.

11. The method of claim 7, wherein the third location and the fourth location are located within a same bank.

12. The method of claim 1, wherein transferring the first metadata to the buffer is associated with a smaller quantity of latches for storage than a quantity of latches for storage associated with transferring the first information to the buffer.

13. A system, comprising:
a host device; and
a memory device, the memory device comprising a buffer, wherein the memory device is configured to:
receive, from the host device, an external read command to retrieve first information from a first location of the memory device;
execute a first internal read command to retrieve first metadata associated with the first information in the external read command from a second location of the memory device based at least in part on receiving the external read command, wherein the first information and the first metadata were stored in the memory device;

transfer the first metadata from the second location of the memory device to the buffer based at least in part on executing the first internal read command;

execute a second internal read command to retrieve the first information from the first location based at least in part on receiving the external read command and transferring the first metadata to the buffer; and transmit, to the host device, the first information and the first metadata based at least in part on executing the second internal read command.

14. The system of claim 13, wherein receiving the external read command is configured to cause the memory device to:

receive, as part of the external read command, a first indication that the first information is associated with the first metadata, wherein executing the first internal read command to retrieve the first metadata is based at least in part on receiving the first indication.

15. The system of claim 13, wherein the memory device is further configured to:

determine that a first duration has elapsed since executing the first internal read command, wherein executing the second internal read command after executing the first internal read command is based at least in part on determining that the first duration has elapsed.

16. The system of claim 13, wherein the first location is part of a first portion of the memory device reserved for storing information, and the second location is part of a second portion of the memory device reserved for storing metadata.

17. An apparatus, comprising:

one or more controllers associated with a memory device, wherein the one or more controllers are configured to cause the apparatus to:

receive, from a host device, an external read command to retrieve first information from a first location of the memory device;

execute a first internal read command to retrieve first metadata associated with the first information in the external read command from a second location of the memory device based at least in part on receiving the external read command, wherein the first information and the first metadata were stored in the memory device;

transfer the first metadata from the second location of the memory device to a buffer based at least in part on executing the first internal read command;

execute a second internal read command to retrieve the first information from the first location based at least in part on receiving the external read command and transferring the first metadata to the buffer; and transmit, to the host device, the first information and the first metadata based at least in part on executing the second internal read command.

18. The apparatus of claim 17, wherein, to receive the external read command, the one or more controllers are configured to cause the apparatus to:

receive, as part of the external read command, a first indication that the first information is associated with the first metadata, wherein executing the first internal read command to retrieve the first metadata is based at least in part on receiving the first indication.

19. The apparatus of claim 17, wherein the one or more controllers are further configured to cause the apparatus to:

determine that a first duration has elapsed since executing the first internal read command, wherein executing the second internal read command after executing the first internal read command is based at least in part on determining that the first duration has elapsed.

20. The apparatus of claim 17, wherein the first location is part of a first portion of the memory device reserved for storing information, and the second location is part of a second portion of the memory device reserved for storing metadata.

* * * * *